H. C. LUCK.
WHEEL ANGLE INDICATOR.
APPLICATION FILED OCT. 8, 1919.
1,362,428. Patented Dec. 14, 1920.
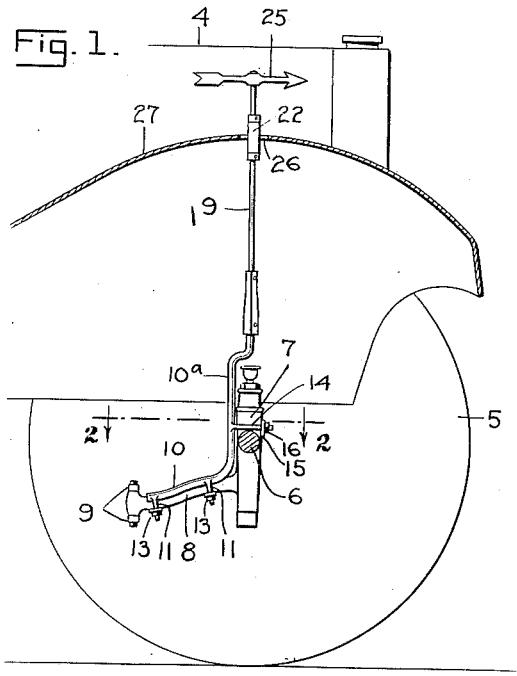
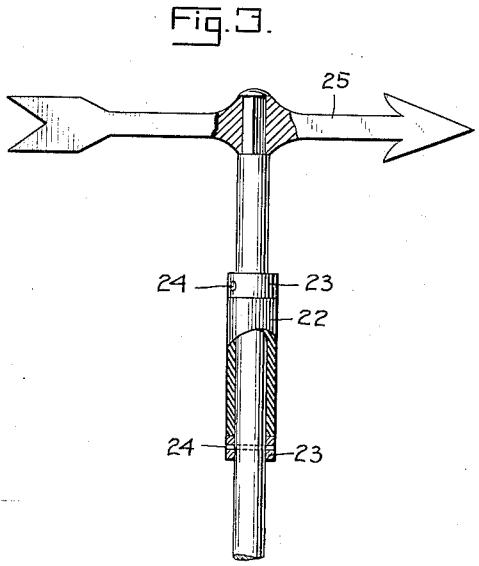
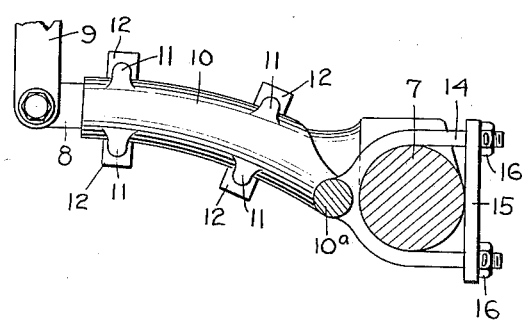
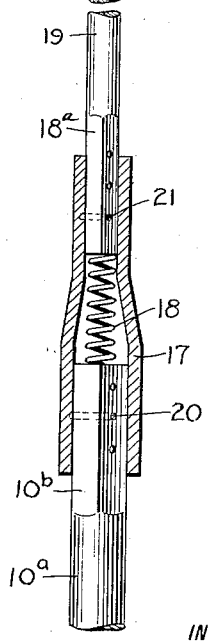
WITNESSES
INVENTOR
Hans Christian Luck
BY
ATTORNEYS

UNITED STATES PATENT OFFICE.

HANS CHRISTIAN LUCK, OF MADERA, CALIFORNIA.

WHEEL-ANGLE INDICATOR.

1,362,428.  Specification of Letters Patent.  Patented Dec. 14, 1920.

Application filed October 8, 1919. Serial No. 329,296.

*To all whom it may concern:*

Be it known that I, HANS CHRISTIAN LUCK, a citizen of the United States, and a resident of Madera, in the county of Madera and State of California, have invented a new and Improved Wheel-Angle Indicator, of which the following is a clear, full, and exact description.

My invention relates to wheel angle indicators; that is, to a device used for enabling the chauffeur or other operator of an automobile to ascertain by means of an appropriate indicator carried by the machine the angular position of the front wheels and movable parts immediately associated therewith.

More particularly stated I seek to provide an indicator of the type known as a plane which by its actual physical position indicates directly and graphically the precise planes in which the wheels extend.

Reference is made to the accompanying drawing forming a part of this specification and in which like reference numerals indicate like parts throughout the several figures.

Figure 1 is a vertical section through a part of an automobile, equipped with my invention;

Fig. 2 is a section on the line 2—2 of Fig. 1 looking in the direction indicated by the arrows;

Fig. 3 is a fragmentary view partly in section showing the indicator shaft.

The automobile body is shown fragmentarily at 4, and one of the wheels appears at 5. A wheel spindle appears at 6 and the steering knuckle at 7. A steering arm appears at 8 and to its outer or free end is connected a steering fork 9. Mounted upon the upper side of the steering arm 8, and following the contour thereof, is a saddle 10. This saddle fits neatly upon the upper side of the arm and is provided with bolts 11 which extend downwardly below the bottom of the steering arm. There are two pairs of these bolts. There are two plates 12 each provided with holes through which a pair of the bolts 11 extend. Nuts 13 fitted upon the bolts engage the plates 12 and jam them tightly against the under side of the steering arm 8. Thus, the saddle 10 is held firmly but detachably upon the steering knuckle 7 by aid of bolts 14, a plate 15 and nuts 16. The rod $10^a$ is bent so that its upper portion is directly above the steering knuckle 7, the axis of this portion of the rod being in exact alinement with the axis of the rotation of the steering knuckle 7 as will be understood from Fig. 1. The upper portion $10^a$ is made square in cross section as shown at $10^b$ in Fig. 3. Fitted upon this square portion $10^b$ is a sleeve 17 containing a spring 18. Another rod 19 is located above the sleeve 17 and is provided with a square portion $18^a$ which extends into the top of this sleeve. By means of pins 20, 21 the sleeve is secured to these rods. The sleeve 17 and parts associated immediately therewith together constitute a coupling. The spring 18 by its tension prevents an undue amount of lost motion being developed within the coupling and also prevents the coupling from becoming noisy. Mounted upon the rod 19 is a sleeve 22 of rubber held in position by collars 23, the latter being of metal and secured in position by rivets 24. Upon the top of the rod 19 is a vane 25 having preferably the form of an arrow as shown.

The parts are so arranged that the rocking motion of the steering knuckle 7 and of the spindle 6 and steering arm 8 merely serve to turn the rod 19 upon its under axis as a center but have no tendency whatever to shift the rod 19 bodily in another direction. The sleeve 22 extends through a hole 26 in the fender 27. The purpose of this sleeve is to prevent the fender from scraping or chafing the rod 19. Thus, it will be seen that while the saddle 10 is clamped upon the steering arm 8 and swings bodily around so as to have considerable angular movement, the center of rotation of the vane 25 and the rod 19 carrying it and even the sleeve 17 serving as a coupling, must necessarily be also the center of rotation of the steering knuckle 7.

By this arrangement the fender can move up and down, the only effect produced thereby being that the vane 25 is at a varying distance from the top of the fender.

The vane 25 in all instances indicates the position of the steering arm 8 and consequently indicates the direction in which the plane of the wheel 5 extends.

The operation of my device is as follows: The parts being assembled and arranged as shown and as above described, the operator drives the automobile in the usual or in any desired manner. If he wishes to ascertain the position of either front wheel relatively to the body of the vehicle he merely glances at the vane 25. This gives him accurate information as to the precise position of the wheel and enables him to comprehend such position far more quickly than would be the case if he found it necessary to translate the reading. This is an important feature for the reason that a chauffeur frequently finds it necessary, in cases of emergency, to act very quickly upon his information, and as a result he has very little time to think. It is therefore essential that the indication be made as graphically and as simply as if he were looking directly at the wheel itself.

I do not limit myself to the precise mechanism shown as variations may be made therefrom without departing from the spirit of my invention.

I claim:

1. A device of the character described comprising a wheel, means for moving the same into different angular positions, a rod connected with said wheel and adapted to be turned by movements thereof into different angular positions, a coupling carried by said rod, a second rod carried by said coupling, a spring mounted within said coupling for the purpose of reducing noise and to diminish vibration, and a vane carried by said last-mentioned rod indicating the position of the wheel.

2. A device of the character described comprising a wheel, a steering knuckle for shifting the same into different planes, a steering arm connected with said steering knuckle, a rod clamped to said steering arm and having a swinging movement upon the axis of said steering knuckle as a center, a second rod connected with said first-mentioned rod, a fender provided with a hole through which said second mentioned rod extends, a sleeve encircling said second mentioned rod to prevent the same from being chafed by said fender as said fender moves relatively to said second mentioned rod, and a vane mounted upon said second mentioned rod for indicating the angular position of the wheel.

HANS CHRISTIAN LUCK.